(12) United States Patent
Hein

(10) Patent No.: US 8,141,178 B2
(45) Date of Patent: Mar. 27, 2012

(54) WATER SAVING TRIPLE FLUSH MECHANISM FOR A TOILET CISTERN

(76) Inventor: Steven Charles Hein, Port Wakefield (AU)

(\*) Notice: Subject to any disclaimer, the term of this patent is extended or adjusted under 35 U.S.C. 154(b) by 356 days.

(21) Appl. No.: 12/572,268

(22) Filed: Oct. 2, 2009

(65) Prior Publication Data

US 2010/0107324 A1    May 6, 2010

(51) Int. Cl.
*E03D 1/14* (2006.01)
*E03D 3/12* (2006.01)
*E03D 5/09* (2006.01)

(52) U.S. Cl. ..................... 4/325; 4/415; 4/410

(58) Field of Classification Search ...... 4/313, 324–327, 4/415, 410, 405; 137/441
See application file for complete search history.

(56) References Cited

U.S. PATENT DOCUMENTS

| 3,186,007 | A  | * | 6/1965  | Falotico .......................... 4/327 |
| 6,112,763 | A  | * | 9/2000  | Orbell ........................... 137/398 |
| 6,484,327 | B2 | * | 11/2002 | Hand ............................... 4/326 |
| 6,584,622 | B1 | * | 7/2003  | Nilsson ............................ 4/324 |
| 2010/0263116 | A1 | * | 10/2010 | Pinizzotto et al. ................ 4/324 |

\* cited by examiner

*Primary Examiner* — Gregory Huson
*Assistant Examiner* — Janie Christiansen
(74) *Attorney, Agent, or Firm* — Michael Molins

(57) ABSTRACT

A water flush mechanism has a plunger having a plug and a stem connected to the plug. There is a lower float located around a lower portion of the stem and a middle float located around the stem. There is an upper float located around the stem. The float is connected to an upper portion of the stem so lifting of the float causes the plunger to rise.

7 Claims, 3 Drawing Sheets

WATER SAVING TRIPLE FLUSH MECHANISM FOR A TOILET CISTERN

FIELD OF THE INVENTION

The present invention relates to water flush mechanisms and, in particular, to a water saving triple flush mechanism for a toilet cistern.

Although the background, objects and preferred embodiments of the invention will be hereinafter described with reference to a triple flush mechanism for a toilet cistern, it is to be understood that the invention is not limited thereto but has wider application. For example, the flush mechanism may be used in other water flush applications in waste receptacles where water needs to be saved.

It is to be understood that the terminology employed herein is for the purpose of description only and should not be regarded as limiting. For instance, the terms "comprising" or "comprises" are to be understood as meaning "including", unless otherwise stated.

Also, the term "water" is to be understood as including both fresh water and recycled water, and the term "flush" is to be understood as including any action of water, whether or not it is "flush-like", that can remove or wash away the contents of a toilet pan or other waste receptacle.

BACKGROUND OF THE INVENTION

Water is a precious resource that is in need of conservation at this time of global climate change and the drought that continues to affect much of Australia.

A large proportion of drinkable water is used in developed economies for the purpose of flushing toilets. There have been many attempts to reduce the amount of water used in the operation of toilets, from waterless urinals and the use of recycled water for flushing, to dual flush toilet cisterns, where the user can choose to flush the contents of the toilet pan with either the full volume of water in the cistern or half of that volume.

Whilst dual flush toilet cisterns have become popular and are in widespread use, there are still many occasions when a half flush of water exceeds the volume that is sufficient to flush away the contents of the pan. This is especially the case when only small amounts of urine, say, from children and baby potties, need to be flushed. In such a case, a smaller volume of water than that used in a half flush would be sufficient.

The present inventor has found that a mechanism for flushing a smaller volume of water than that used in a half flush may be developed which can cooperate with a full flush and half flush mechanism so as to form an interactive triple flush mechanism.

SUMMARY OF THE INVENTION

It is, therefore, an object of the present invention to overcome, or at least substantially ameliorate, the aforementioned shortcomings of the prior art.

It is another object of the present invention to provide a mechanism for flushing a smaller volume of water than that used in a half flush and which can cooperate with a full flush and half flush mechanism so as to form an interactive triple flush mechanism.

It has been found by the present inventor that these and other objects of the invention may be achieved in general by providing a water flush mechanism of a container of water for flushing the contents of a waste receptacle, comprising;

(a) a plunger having a plug adapted to releasably seal a water outlet of the water container, and a stem connected to the plug, (b) a lower tubular float located around a lower portion of the stem, and having a first height, (c) a middle tubular float located around the stem above, and being supported by, the lower tubular float, and having a second height, (d) an upper tubular float located around the stem above, and supported by, the middle tubular float, and having a third height, the upper tubular float being connected to an upper portion of the stem of the plunger such that a lifting of the upper tubular float causes a raising of the plunger, (e) a lower float pull-up assembly comprising a first button connected via first float stop means to a top end of a long pull-up rod, a bottom end of which is connected to the lower tubular float, the first float stop means being adapted, when activated, to maintain the lower tubular float in a first pre-lifting position beneath the water level in the container, wherein, in use, pressing the first button inactivates the first float stop means and allows the lower tubular float, together with the middle and upper floats supported thereby, to lift to a floating position on the water level, whereby the plug of the plunger is raised from the water outlet to allow water to flush from the container, the volume of water flushed being proportional to the sum of the first, second and third heights, (f) a middle float pull-up assembly comprising a second button connected via second float stop means to a top end of an intermediate length pull-up rod, a bottom end of which is connected to the middle tubular float, the second float stop means being adapted, when activated, to maintain the middle tubular float in a second pre-lifting position beneath the water level in the container, wherein, in use, pressing the second button inactivates the second float stop means and allows the middle tubular float, together with the upper float supported thereby, to lift to a floating position on the water level, whereby the plug of the plunger is raised from the water outlet to allow water to flush from the container, the volume of water flushed being proportional to the sum of the first and second heights, (g) an upper float pull-up assembly comprising a third button connected to a top end of a short pull-up rod, a bottom end of which is connected to the upper tubular float, the upper tubular float being maintained in a pre-lifting position beneath the water level in the container, wherein, in use, pressing the third button allows the upper tubular float to lift to a floating position on the water level, whereby the plug of the plunger is raised from the water outlet to allow water to flush from the container, the volume of water flushed being proportional to the third height.

Preferably, each of the first and second float stop means comprise magnets.

It is preferred that each magnet is connected to a lever arm operable by a respective button, and the grip of the magnet on the lever arm is broken just before the plug is raised from the water outlet.

The plunger is preferably housed in a tubular guide having an internal floor portion below the lower tubular float, the plug of the plunger being below the internal floor portion.

In a preferred form, each pull-up rod is connected to its respective tubular float by abutting against the underside of that tubular float.

It is further preferred that the tubular guide has water ejection slots for each of the tubular floats, each pull-up rod extending through a respective slot, wherein the lifting of a tubular float opens a slot that was closed by that float being in the pre-lifting position, the so opened slot allowing water to enter the tubular guide and to flush from the container via the water outlet.

In a preferred form of the invention, the water container is a toilet cistern.

There has been thus outlined, rather broadly, the more important features of the invention in order that the detailed description thereof that follows may be better understood and put into practical effect, and in order that the present contribution to the art may be better appreciated.

There are additional features of the invention that will be described hereinafter. As such, those skilled in the art will appreciate that the conception, upon which the disclosure is based, may be readily utilized as the basis for designing other assemblies and methods for carrying out the objects of the present invention. It is important, therefore, that the broad outline of the invention described above be regarded as including such equivalent constructions in so far as they do not depart from the spirit and scope of the present invention.

SUMMARY OF THE DRAWINGS

The invention will be better understood and objects other than those set forth above will become apparent when consideration is given to the following detailed description thereof. Such description makes reference to the accompanying drawings, in which.

DESCRIPTION OF PREFERRED EMBODIMENTS

Figure 1:
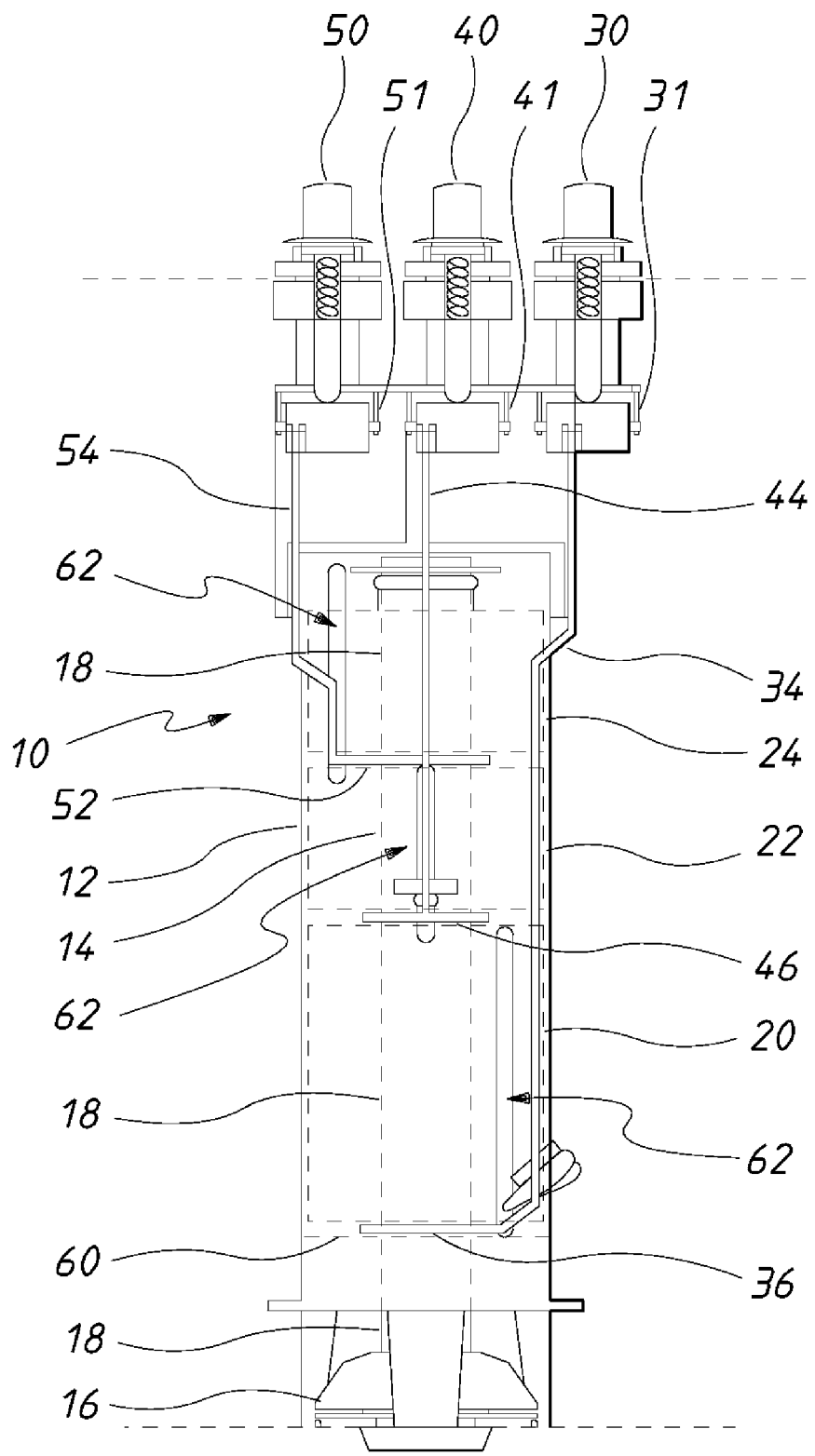
FIG. 1 is a partly sectional front view of a triple flush mechanism for a toilet cistern according to a preferred embodiment of the invention.
Figure 2:
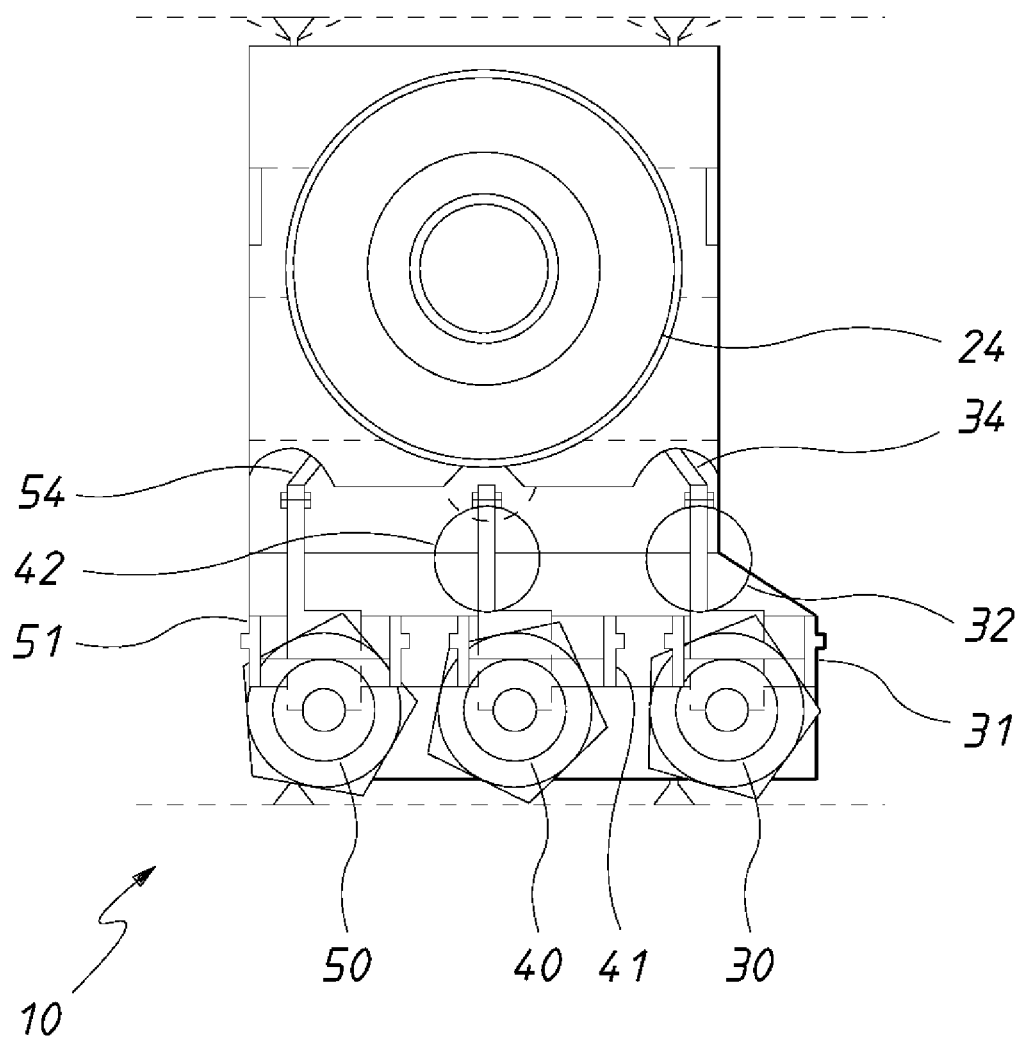
FIG. 2 is a top view of the triple flush mechanism shown in FIG. 1.
Figure 3:
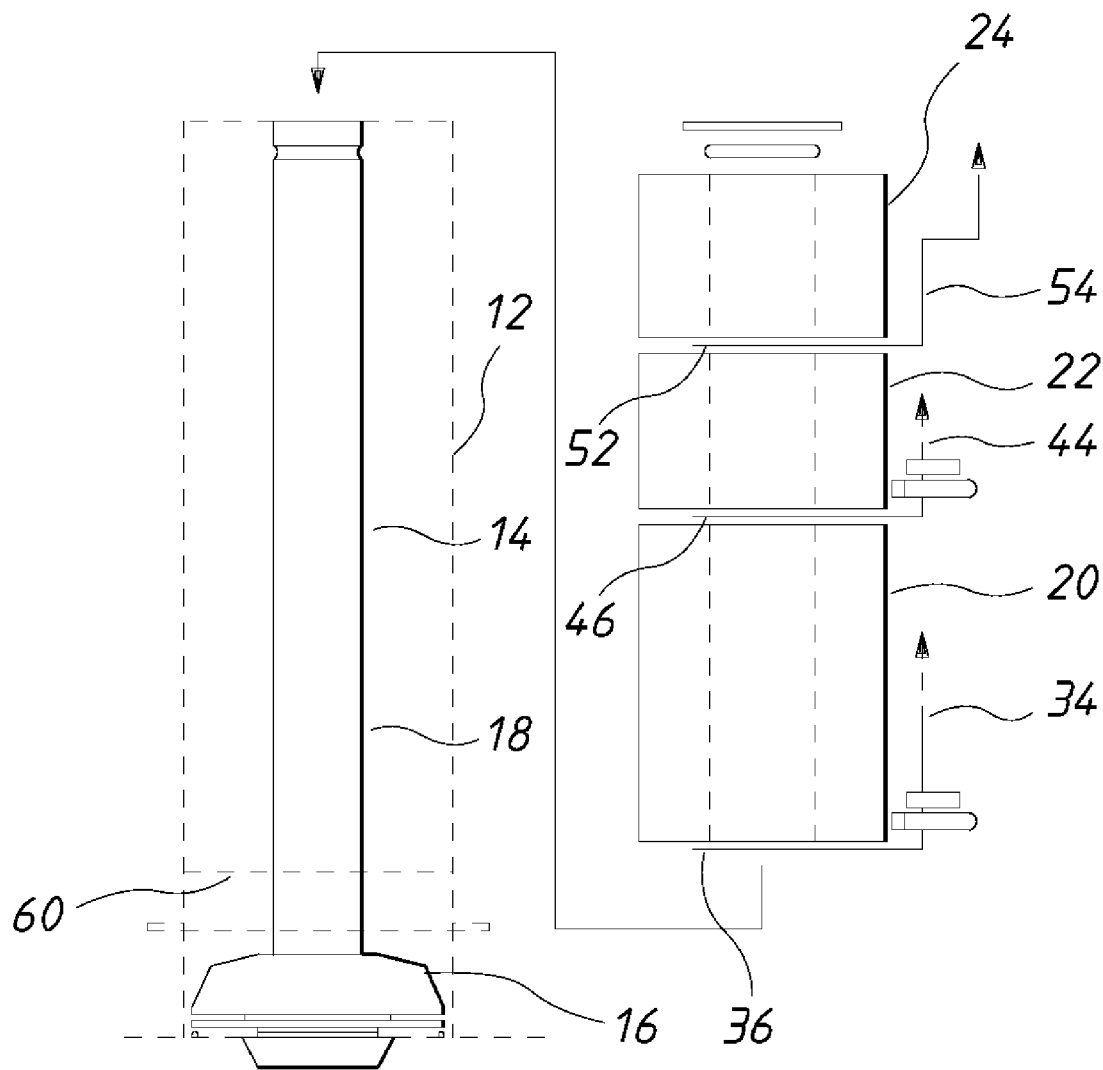
FIG. 3 is a partly exploded front view of the triple flush mechanism shown in FIG. 1.

With reference now to the above summarized drawings of FIGS. 1 to 3, a water saving triple flush mechanism for a toilet cistern embodying the principles and concepts of the present invention and generally designated by the reference numeral 10 will now be described.

The triple flush mechanism 10 of a toilet cistern containing water for flushing the contents of a toilet pan includes a tubular guide 12 in which is housed a plunger 14. The plunger has a plug 16 adapted to releasably seal a water outlet of the cistern, and a stem 18 connected to the plug.

There is a lower tubular float 20 located around a lower portion of the stem 18, and having a first height. There is a middle tubular float 22 located around the stem 18 above, and being supported by, the lower tubular float 20, and having a second height. There is an upper tubular float 24 located around the stem 18 above, and supported by, the middle tubular float 22, and having a third height. The upper tubular float 24 is connected to an upper portion of the stem 18 of the plunger 14 such that a lifting of the upper tubular float 24 causes a raising of the plunger 14.

There is a lower float pull-up assembly that includes a first button 30 that operates a lever assembly 31 connected via a pair of attractive magnets 32 to a top end of a long pull-up rod 34. A bottom end of the rod 34, in the form of a ring 36, is connected to the lower tubular float 20 by abutting against the underside of the float 20. Continued attraction between the magnets 32 maintains the lower tubular float 20 in a first pre-lifting position beneath the water level in the cistern. When desired for use, pressing the first button 30 causes the pair of attractive magnets 32 to separate sufficiently to allow the lower tubular float 20, together with the middle and upper floats 22, 24 supported thereby, to lift to a floating position on the water level. At the same time, the plug 16 of the plunger 14 is raised from the water outlet to allow water to flush from the cistern. The volume of water flushed from the cistern is proportional to the sum of the first, second and third heights, and is to be regarded herein as a full flush.

There is a middle float pull-up assembly that includes a second button 40 that operates a lever assembly 41 connected via a pair of attractive magnets 42 to a top end of an intermediate length pull-up rod 44. A bottom end of the rod 44, in the form of a ring 46, is connected to the middle tubular float 22 by abutting against the underside of the float 22. Continued attraction between the magnets 42 maintains the middle tubular float 22 in a second pre-lifting position beneath the water level in the cistern. When desired for use, pressing the second button 40 causes the pair of attractive magnets 42 to separate sufficiently to allow the middle tubular float 22, together with the upper float 24 supported thereby, to lift to a floating position on the water level. At the same time, the plug 16 of the plunger 14 is raised from the water outlet to allow water to flush from the cistern. The volume of water flushed from the cistern is proportional to the sum of the first and second heights, and is to be regarded herein as a half flush.

There is an upper float pull-up assembly that includes a third button 50 that operates a lever assembly 51 connected to a top end of a short pull-up rod 54. A bottom end of the rod 54, in the form of a ring 52, is connected to the upper tubular float 24, by abutting against the underside of the float 24. The upper tubular float 24 is maintained in a pre-lifting position beneath the water level in the cistern. When desired for use, pressing the third button 50 causes the upper tubular float 24 to lift to a floating position on the water level. At the same time, the plug 16 of the plunger 14 is raised from the water outlet to allow water to flush from the cistern. The volume of water flushed from the cistern is proportional to the third height, and is to be regarded herein as either a quarter flush or a third flush.

The tubular guide 12 has an internal floor portion 60 below the lower tubular float 20, and the plug 16 of the plunger 14 is below the internal floor portion.

The tubular guide 12 also has water ejection slots 62 for each of the tubular floats 20, 22, 24, and each pull-up rod 34, 44, 54 extends through a respective slot. The lifting of a tubular float 20, 22, 24 opens a slot 62 that was closed by that float when it was in the pre-lifting position. The so opened slot 62 allows water to enter the tubular guide 12 and to flush from the cistern via the water outlet.

It will be readily apparent from the above description of a preferred embodiment of a triple flush mechanism for a toilet cistern according to the invention that there are various advantages of such mechanisms.

One advantage is that the triple flush mechanism allows for flushing a smaller volume of water than that used in a half flush, thereby saving water.

Another advantage is that the triple flush mechanism can be retrofitted into most existing toilet cisterns with minimal or no modification once the existing single or dual flush mechanism is removed therefrom.

Yet other advantages of the triple flush mechanism described above are that it will not require regular maintenance or replacement despite heavy use, it will be reliable over the life of the cistern, and it is relatively lightweight and slim in size, simple to use and relatively inexpensive.

Still further advantages of the present invention will be apparent to persons skilled in the art.

It will also be readily apparent to persons skilled in the art that various modifications may be made in details of design and construction of the embodiment of the triple flush mechanism for a toilet cistern, and in the steps of the method using the mechanism, described above without departing from the scope or ambit of the present invention.

The reference in this specification to any prior publication (or information derived from it), or to any matter which is known, is not, and should not be taken as an acknowledgement or admission or any form of suggestion that that prior publication (or information derived from it) or known matter forms part of the common general knowledge in the field of endeavour to which this specification relates before the filing date of this patent application.

The invention claimed is:

1. A water flush mechanism of a container of water for flushing the contents of a waste receptacle, comprising;
    (a) a plunger having a plug adapted to releasably seal a water outlet of the water container, and a stem connected to the plug,
    (b) a lower tubular float located around a lower portion of the stem, and having a first height,
    (c) a middle tubular float located around the stem above, and being supported by, the lower tubular float, and having a second height,
    (d) an upper tubular float located around the stem above, and supported by, the middle tubular float, and having a third height, the upper tubular float being connected to an upper portion of the stem of the plunger such that a lifting of the upper tubular float causes a raising of the plunger,
    (e) a lower float pull-up assembly comprising a first button connected via first float stop means to a top end of a long pull-up rod, a bottom end of which is connected to the lower tubular float, the first float stop means being adapted, when activated, to maintain the lower tubular float in a first pre-lifting position beneath the water level in the container, wherein, in use, pressing the first button inactivates the first float stop means and allows the lower tubular float, together with the middle and upper floats supported thereby, to lift to a floating position on the water level, whereby the plug of the plunger is raised from the water outlet to allow water to flush from the container, the volume of water flushed being proportional to the sum of the first, second and third heights,
    (f) a middle float pull-up assembly comprising a second button connected via second float stop means to a top end of an intermediate length pull-up rod, a bottom end of which is connected to the middle tubular float, the second float stop means being adapted, when activated, to maintain the middle tubular float in a second pre-lifting position beneath the water level in the container, wherein, in use, pressing the second button inactivates the second float stop means and allows the middle tubular float, together with the upper float supported thereby, to lift to a floating position on the water level, whereby the plug of the plunger is raised from the water outlet to allow water to flush from the container, the volume of water flushed being proportional to the sum of the first and second heights,
    (g) an upper float pull-up assembly comprising a third button connected to a top end of a short pull-up rod, a bottom end of which is connected to the upper tubular float, the upper tubular float being maintained in a pre-lifting position beneath the water level in the container, wherein, in use, pressing the third button allows the upper tubular float to lift to a floating position on the water level, whereby the plug of the plunger is raised from the water outlet to allow water to flush from the container, the volume of water flushed being proportional to the third height.

2. The water flush mechanism of claim 1 wherein each of the first and second float stop means comprise magnets.

3. The water flush mechanism of claim 2 wherein each magnet is connected to a lever arm operable by a respective button, and the grip of the magnet on the lever arm is broken just before the plug is raised from the water outlet.

4. The water flush mechanism of claim 3 wherein the plunger is housed in a tubular guide having an internal floor portion below the lower tubular float, the plug of the plunger being below the internal floor portion.

5. The water flush mechanism of claim 4 wherein each pull-up rod is connected to its respective tubular float by abutting against the underside of that tubular float.

6. The water flush mechanism of claim 5 wherein the tubular guide has water ejection slots for each of the tubular floats, each pull-up rod extending through a respective slot, wherein the lifting of a tubular float opens a slot that was closed by that float being in the pre-lifting position, the so opened slot allowing water to enter the tubular guide and to flush from the container via the water outlet.

7. The water flush mechanism of claim 6 wherein the water container is a toilet cistern.

* * * * *